(12) United States Patent
Kurokawa et al.

(10) Patent No.: US 7,505,644 B2
(45) Date of Patent: Mar. 17, 2009

(54) OPTICAL MEMORY REPRODUCTION APPARATUS AND INCIDENCE POSITIONING METHOD FOR READ LIGHT THEREOF

(75) Inventors: Yoshiaki Kurokawa, Chiba (JP); Shogo Yagi, Ibaraki-ken (JP); Akinori Furuya, Kodaira (JP); Masahiro Endo, Hachioji (JP); Tadayuki Imai, Zama (JP); Hiroshi Yoshikawa, Hachioji (JP)

(73) Assignee: Nippon Telephone & Telegraph Corporation (JP)

( * ) Notice: Subject to any disclaimer, the term of this patent is extended or adjusted under 35 U.S.C. 154(b) by 317 days.

(21) Appl. No.: 10/575,284

(22) PCT Filed: Oct. 21, 2004

(86) PCT No.: PCT/JP2004/015628

§ 371 (c)(1),
(2), (4) Date: Apr. 11, 2006

(87) PCT Pub. No.: WO2005/041176

PCT Pub. Date: May 6, 2005

(65) Prior Publication Data

US 2007/0147749 A1    Jun. 28, 2007

(30) Foreign Application Priority Data

Oct. 23, 2003    (JP) ............................. 2003-363414

(51) Int. Cl.
*G02B 6/00* (2006.01)
*G06K 7/10* (2006.01)

(52) U.S. Cl. ........................................ 385/14; 235/454

(58) Field of Classification Search ....................... None
See application file for complete search history.

(56) References Cited

U.S. PATENT DOCUMENTS 6,729,541 B1 *    5/2004    Kurokawa et al. ........... 235/454

FOREIGN PATENT DOCUMENTS

| JP | 64-019535 | 1/1989 |
| JP | 04-255918 | 9/1992 |
| JP | 08-096371 | 4/1996 |

(Continued)

*Primary Examiner*—Sung Pak
*Assistant Examiner*—Hoang Tran
(74) *Attorney, Agent, or Firm*—Kilpatrick Stockton LLP

(57) ABSTRACT

An optical memory medium (2) has cores (21) each constituting a planar optical waveguide and clads (22) sandwiching each core, and has a data image (203) in which data is recorded as a scattering factor and a pair of positioning marks (201, 202) which are scattering factors required for positioning at an interface between a core (21) and a clad (22) or in the core (21). A read light (103) travels while spreading in the core (21) and scatters and interferes by the data image (203), and data is reproduced from a data reproduction light (1031) generated by this scattering and interference. A pair of positioning lights (101, 102) are caused to enter the core (21) with offsets with respect to the read light (103) in opposite directions along a thickness direction of the core (21), and scatter and interfere at the pair of positioning marks (201, 202). Incidence positions of the lights emitted from a light source (11) with respect to the core (21) in a thickness direction of the core (21) are controlled based on intensities of a pair of positioning mark lights (1011, 1021) generated by this scattering and interference.

16 Claims, 12 Drawing Sheets

FOREIGN PATENT DOCUMENTS

| | | |
|---|---|---|
| JP | 11-031330 | 2/1999 |
| JP | 2001-52128 | 2/2001 |
| JP | 2002-251123 | 9/2002 |
| JP | 2003-51122 | 2/2003 |
| JP | 2005-11427 | 1/2005 |

* cited by examiner

OPTICAL MEMORY REPRODUCTION APPARATUS AND INCIDENCE POSITIONING METHOD FOR READ LIGHT THEREOF

TECHNICAL FIELD

The present invention relates to an optical memory reproduction apparatus and an incidence positioning method for a read light thereof which cause a read light to accurately enter an optical memory medium when a read light which reproduces data from the optical memory medium travels while spreading in a core of the optical memory medium.

BACKGROUND ART

In recent years, in a field of mobile computing in particular, a demand for a memory which is formed compact, can be easily carried and has a large data capacity has been increased. A planar optical waveguide type optical memory using a planar optical waveguide as a data area can be increased in capacity by superimposing planar optical waveguides, and appears promising as a storage medium in future. Further, an optical memory reproduction apparatus which reproduces data from such a planar optical waveguide type optical memory has been also studied in many ways.

FIG. 1 is a view showing a configuration and a utilization mode of a conventional optical memory reproduction apparatus 1A.

The optical memory reproduction apparatus 1A is an apparatus which reproduces data from an optical memory medium 2 formed by alternately superimposing a core 21 and a clad 22 constituting a planar optical waveguide.

In data reproduction by the optical memory reproduction apparatus 1A, a light source 11 first emits a collimated laser light 1 toward an end surface 200 of the optical memory medium 2. Further, a condenser lens 12 condenses a part of the laser light 111 into a dot-like or a circular pattern, thereby generating a read light 103 which travels in a direction of the optical memory medium 2.

When the read light 103 reaches the end surface 200 of the optical memory medium 2, a part of this light enters the core 21. A data image 203 obtained by two-dimensionally recording data by using a scattering factor is written in an optical coupling area 2103 where the core 21 is coupled with the read light 103. The scattering factor expressing the data image 203 is formed as, e.g., irregularities on an interface between the core 21 and the clad 22 or a change in refraction index of the core 21 in the core 21.

When the read light 103 is coupled in the optical coupling area 2103, the read light 103 scatters and interferes by the data image 203, and exits as a data reproduction light 1031 to the outside of the optical memory medium 2 from the interface between the core and the clad or the inside of the core where the scattering factor is formed through the clad.

Then, the data reproduction light 1031 is imaged by an imaging element 133, and a data reproducing section 14 reproduces data based on an obtained reproduction image.

In order to reproduce data stored in the optical memory medium without an error by using the optical memory reproduction apparatus 1A, a read light must be caused to accurately enter a target core.

It is to be noted that the detail of positioning of the read light is described in Japanese Patent Application Laid-open No. 2003-51122.

However, the content of Japanese Patent Application Laid-open No. 2003-51122 is an example using a zonal read light which does not spread in the core, and it cannot be applied to positioning of a read light which travels while spreading in a core, e.g., a read light which is condensed toward a focal point and spreads from the focal point. As a result, when a spreading read light is used, positioning of this light cannot be carried out, and realization of such an optical memory reproduction apparatus is obstructed.

DISCLOSURE OF THE INVENTION

In view of the above-described problems in the prior art, it is an object of the present invention to provide an optical memory reproduction apparatus and a positioning method for a read light thereof which allow a read light to accurately enter a core when the read light which reproduces data from an optical memory medium travels while spreading in the core of the optical memory medium.

To achieve this object, according to the present invention concerning a first aspect, there is provided an optical memory reproduction apparatus which reproduces data from an optical memory medium comprising: cores each of which constitutes a planar optical waveguide; and clads which sandwich each core, and having: a data image in which data is recorded as a scattering factor; and a pair of positioning marks which are respectively scattering factors required for positioning, at an interface between a core and a clad or in the core, the optical memory reproduction apparatus comprising: a light source which emits: a read light which is caused to enter the core from an end surface of the optical memory medium, travels while spreading in the core, and is coupled with the core to form an optical coupling area in such a manner that the optical coupling area includes the data image; and a pair of positioning lights which are caused to enter the core with offsets with respect to the read light in opposite directions along a thickness direction of the core, travels in the core, and are coupled with the core to form optical coupling areas in such a manner that the optical coupling areas include the pair of positioning marks; a data reproduction light imaging element which receives a data reproduction light generated due to scattering and interference of the read light in the data image; a data reproducing unit which reproduces data imaged by the data reproduction light imaging element; a positioning mark light receiving element which receives a pair of positioning mark lights generated due to scattering and interference of the pair of positioning lights in the pair of positioning marks; and a light source position control unit which controls an incidence position of the read light with respect to the core in the thickness direction thereof based on intensities of the pair of positioning mark lights detected by the positioning mark light receiving element.

According to the present invention concerning a second aspect, in the present invention concerning the first aspect, a condensing pattern of each positioning light is a dot-like shape or a circular shape.

According to the present invention concerning a third aspect, in the present invention concerning the first aspect, the light source alternately emits the pair of positioning lights in a time-sharing manner.

Furthermore, to achieve the above-described object, according to the present invention concerning a fourth aspect, there is provided an optical memory reproduction apparatus which reproduces data from an optical memory medium comprising: cores each of which constitutes a planar optical waveguide; and clads which sandwich each core, and having: a pair of data images in which the data is recorded as a scattering factor; and a pair of positioning marks which are respectively scattering factors required for positioning, at an interface between a core and a clad or in the core, the optical memory reproduction apparatus comprising: a light source which emits a pair of positioning/read lights which are caused to enter the core from an end surface of the optical memory medium at different positions in a thickness direction of the core, travel while spreading in the core, and are coupled with the core to form optical coupling areas in such a manner that the optical coupling areas respectively include the pair of data images and the pair of positioning marks; a data reproduction light imaging element which receives a pair of data reproduction lights generated due to scattering and interference of the pair of positioning/read lights in the pair of data images; a data reproducing unit which reproduces data imaged by the data reproduction light imaging element; a positioning mark light receiving element which receives a pair of positioning mark lights generated due to scattering and interference of the pair of positioning/read lights in the pair of positioning marks; and a light source position control unit which controls incidence positions of the pair of positioning/read lights with respect to the core in the thickness direction thereof based on intensities of the pair of positioning mark lights detected by the positioning mark light receiving element.

According to the present invention concerning a fifth aspect, in the present invention concerning the fourth aspect, a condensing pattern of each positioning/read light is a dot-like shape or a circular shape.

According to the present invention concerning a sixth aspect, in the present invention concerning the fourth aspect, the light source alternately emits the pair of positioning/read lights in a time-sharing manner.

Moreover, to achieve the above-described object, according to the present invention concerning a seventh aspect, there is provided an optical memory reproduction apparatus which reproduces data from an optical memory medium comprising: cores each of which constitutes a planar optical waveguide; and clads which sandwich each core, and having: a data image in which data is recorded as a scattering factor; and a pair of positioning marks which are respectively scattering factors required for positioning, at an interface between a core and a clad or in the core, the optical memory reproduction apparatus comprising: a light source which emits a positioning/read light which has a elliptic or rectangular cross section, is caused to enter the core from an end surface of the optical memory medium at an angle by which a longitudinal direction of the cross section is not parallel with the interface, travels while spreading in the core, and is coupled with the core to form an optical coupling area in such a manner that a central portion of the optical coupling area includes the data image and both end portions of the optical coupling area includes the pair of positioning marks; a data reproduction light imaging element which receives a data reproduction light generated due to scattering and interference of the positioning/read light in the data image; a data reproducing unit which reproduces data imaged by the data reproduction light imaging element; a positioning mark light receiving element which receives a pair of positioning mark lights generated due to scattering and interference of the positioning/read light in the pair of positioning marks; and a light source position control unit which controls an incidence position of the positioning/read light with respect to the core in a thickness direction thereof based on intensities of the pair of positioning mark lights detected by the positioning mark light receiving element.

According to the present invention concerning an eighth aspect, in the present invention concerning the first, second or seventh aspect, the light source position control section compares the intensities of the pair of positioning mark lights with each other, determines a movement direction of the light emitted from the light source and moves the light in accordance with a result of the comparison, and controls the incidence position of the light emitted from the light source in such a manner that an intensity difference becomes zero.

Additionally, to achieve the above-described object, according to the present invention concerning a ninth aspect, there is provided an incidence positioning method for a read light in an optical memory reproduction apparatus applying the read light which travels while spreading to a core portion on an end surface of an optical memory medium comprising cores each of which constitutes a planar optical waveguide and clads which sandwich each core and having a data image in which data is recorded as a scattering factor and a pair of positioning marks which are respectively scattering factors required for positioning, at an interface between a core and a clad or in the core, the read light being coupled with the core to form an optical coupling area in such a manner that the optical coupling area includes the data image, the optical memory reproduction apparatus reproducing data based on a data reproduction light generated due to scattering and interference of the read light in the data image, the incidence positioning method comprising: causing a pair of positioning lights to enter the end surface of the optical memory medium in such a manner that the pair of positioning lights have offsets with respect to the read light in opposite directions along a thickness direction of the core; forming an optical coupling area by coupling of the pair of positioning lights which have entered the core with the core in such a manner that the optical coupling area includes the pair of positioning marks; receiving by a positioning mark light receiving element a pair of positioning mark lights generated due to scattering and interference of the pair of positioning lights in the pair of positioning marks; and controlling an incidence position of the read light emitted from the light source with respect to the core in a thickness direction thereof based on intensities of the pair of positioning mark lights which have entered the positioning mark light receiving element.

According to the present invention concerning a 10th aspect, in the present invention concerning the ninth aspect, a condensing pattern of each positioning light is a dot-like shape or a circular shape.

According to the present invention concerning an 11th aspect, in the present invention concerning the ninth aspect, the pair of positioning lights are alternately emitted in a time-sharing manner.

Further, to achieve the above-described object, according to the present invention concerning a 12th aspect, there is provided an incidence positioning method for a pair of positioning/read lights in an optical memory reproduction apparatus applying the pair of positioning/read lights which travel while spreading to a core portion on an end surface of an optical memory medium comprising cores each of which constitutes a planar optical waveguide and clads which sandwich each core and having a pair of data images in which data is recorded as a scattering factor and a pair of positioning marks which are respectively scattering factors required for positioning, at an interface between a core and a clad or in the core, the pair of positioning/read lights being coupled with the core to form optical coupling areas in such a manner that the optical coupling areas include the pair of data images, the optical memory reproduction apparatus reproducing data based on a pair of data reproduction lights generated due to scattering and interference of the pair of positioning/read lights in the pair of data images, the incidence positioning method comprising: forming optical coupling areas by coupling the pair of positioning/read lights which have entered the core with the core in such a manner that the optical coupling areas include the pair of positioning marks is included; receiving by positioning mark light receiving element a pair of positioning mark lights generated by scattering and interference of the pair of positioning/read lights in the pair of positioning marks; and controlling incidence positions of the pair of positioning/read lights emitted from the light source with respect to the core in a thickness direction thereof based on intensities of the pair of positioning mark lights which have entered the positioning mark light receiving element.

According to the present invention concerning a 13th aspect, in the present invention concerning the 12th aspect, a condensing pattern of each positioning/read light is a dot-like shape or a circular shape.

According to the present invention concerning a 14th aspect, in the present invention concerning the 12th aspect, the pair of positioning/read lights are alternately emitted in a time-sharing manner.

Furthermore, to achieve the above-described object, according to the present invention concerning a 15th aspect, there is provided an incidence positioning method for a positioning/read light in an optical memory reproduction apparatus applying the positioning/read light which has an elliptic or rectangular cross section and travels while spreading to a core portion on an end surface of an optical memory medium at an angle by which a longitudinal direction of the cross section is not parallel with an interface between a core and a clad, the optical memory medium comprising cores each of which constitutes a planar optical waveguide and clads which sandwich each core and having a data image in which data is recorded as a scattering factor and a pair of positioning marks which are respectively scattering factors required for positioning at the interface between the core and the clad or in the core, the positioning/read light being coupled with the core to form an optical coupling area in such a manner that the optical coupling area includes the data image, the optical memory reproduction apparatus reproducing data based on a data reproduction light generated due to scattering and interference of the positioning/read light in the data image, the incidence positioning method comprising: forming the optical coupling area by coupling the positioning/read light which has entered the core with the core in such a manner that both end portions of the optical coupling area include the pair of positioning marks; receiving by a positioning mark light receiving element a pair of positioning mark lights generated due to scattering and interference of the positioning/read light in the pair of positioning marks; and controlling an incidence position of the positioning/read light emitted from the light source with respect to the core in a thickness direction thereof based on intensities of the pair of positioning mark lights which have entered the positioning mark light receiving element.

According to the present invention concerning a 16th aspect, in the present invention concerning the ninth, 12th or 15th aspect, the step of controlling a position of the light source compares the intensities of the pair of positioning mark lights with each other, determines a movement direction of the light emitted from the light source and moves the light in accordance with a result of the comparison, and controls the incidence position of the light emitted from the light source in such a manner that an intensity difference becomes zero.

BEST MODE FOR CARRYING OUT THE INVENTION

An embodiment according to the present invention will now be described hereinafter with reference to the accompanying drawings.

Figure 1:
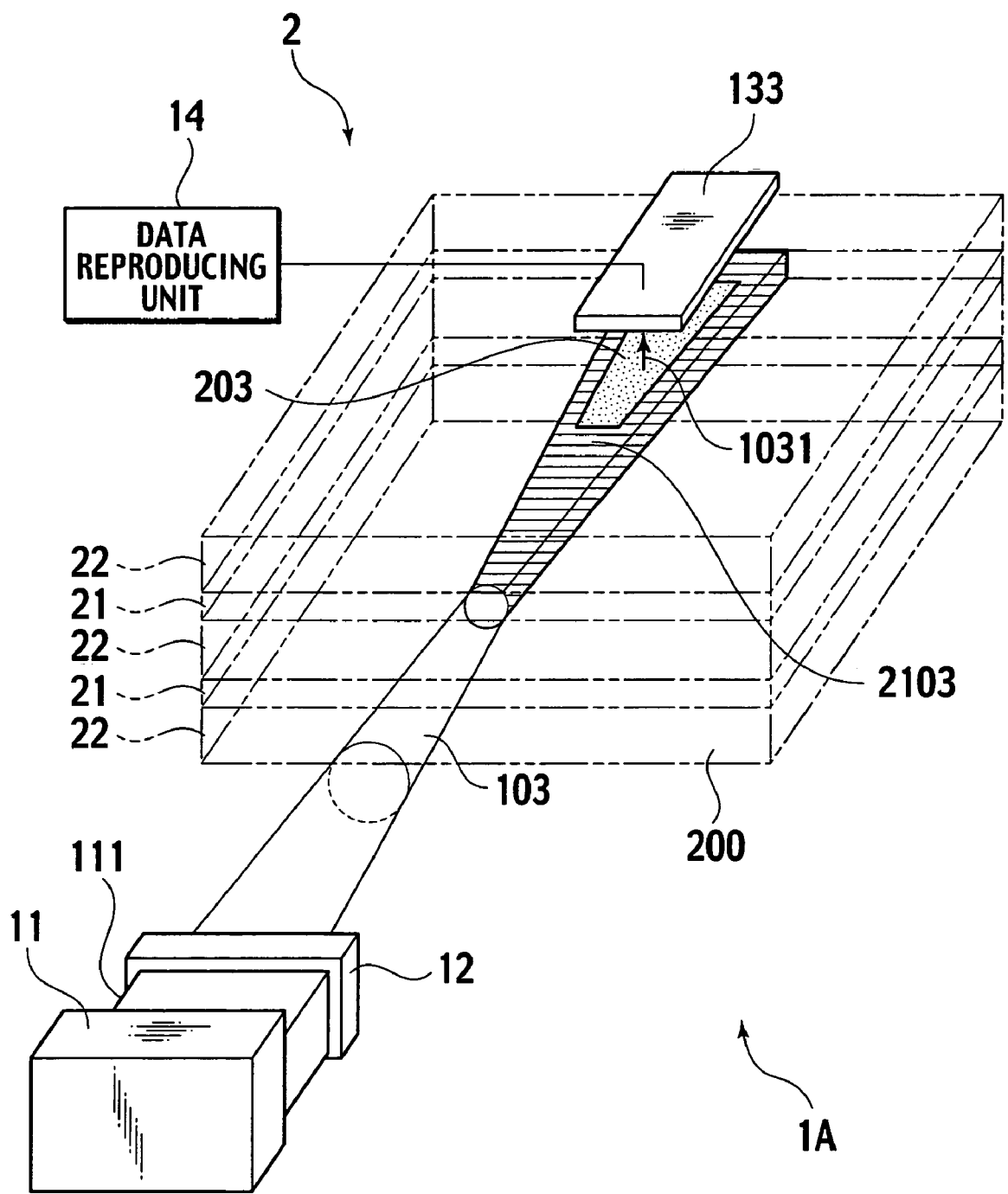
FIG. 1 is a view showing a configuration and a utilization mode of a conventional optical memory reproduction apparatus 1A.
Figure 2:
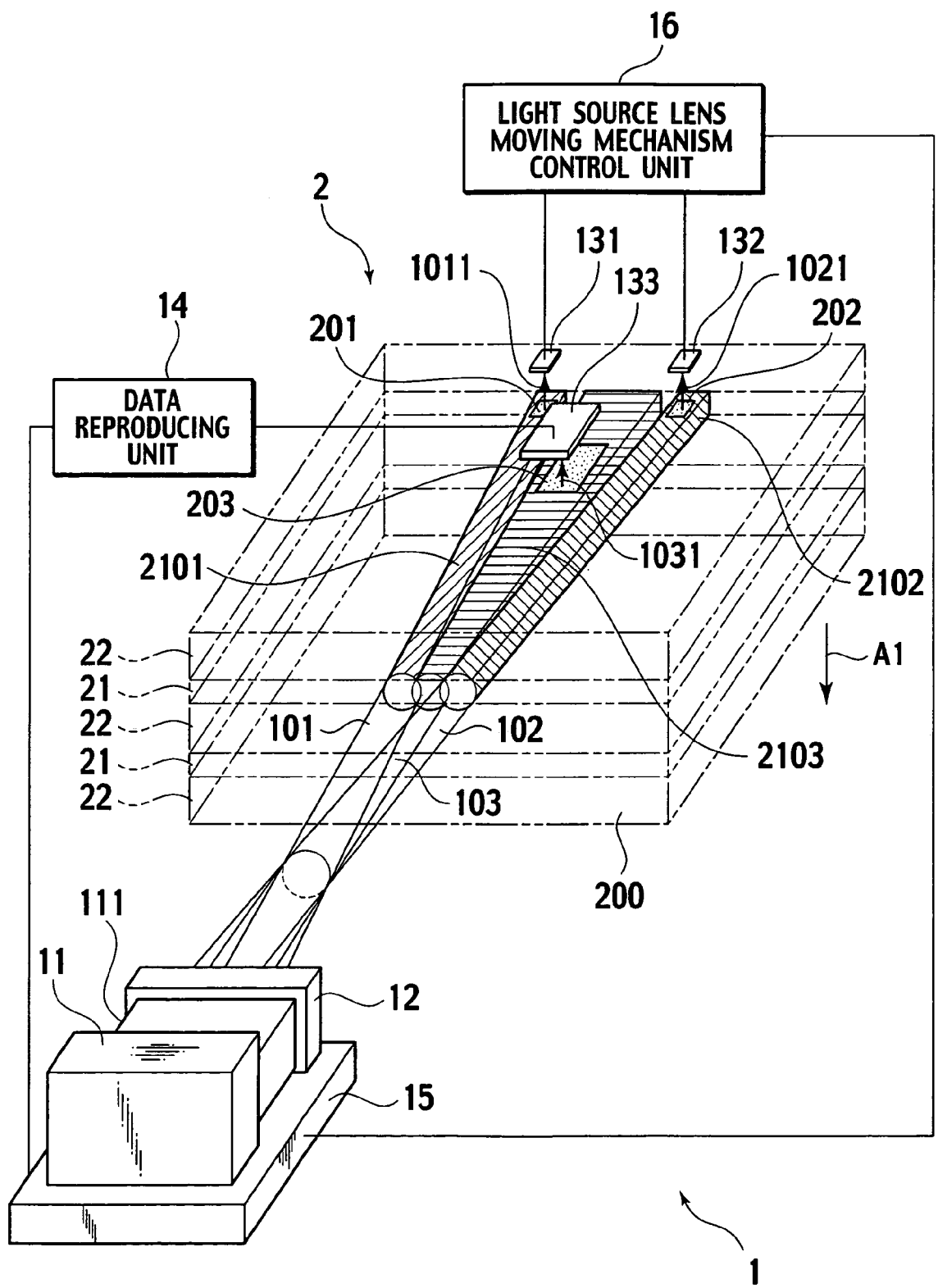
FIG. 2 is a view showing a configuration and a utilization mode of an optical memory reproduction apparatus 1 to which the present invention is applied.

FIG. 2 is a view showing a configuration and a utilization mode of an optical memory reproduction apparatus 1 to which the present invention is applied. It is to be noted that like reference numerals denote parts which are functionally equal to the constituent elements of the optical memory reproduction apparatus 1A.

The optical memory reproduction apparatus 1 is an apparatus which reproduces stored data from an optical memory medium 2 formed by alternately superimposing cores 21 and clads 22 in, e.g., a vertical direction as shown in FIG. 2. A thickness of the core 21 is, e.g., slightly smaller than approximately 2 μm.

The optical memory reproduction apparatus 1 comprises a light source 11 which emits a laser light 111 toward an end surface 200 of the optical memory medium 2. Further, this apparatus also comprises a condenser lens 12 which condenses the laser light 111 between the light source 11 and the optical memory medium 2.

The condenser lens 12 condenses a part of the laser light 111 into a dot-like or circular pattern to generate a positioning light 101. Likewise, the condenser lens 12 generates a positioning light 102 and a read light 103. It is to be noted that the positioning lights 101 and 102 are used to determine an optimum incidence position of the read light 103.

A focal point of each of the positioning lights 101 and 102 and the read light 103 is positioned on the end surface 200 of the optical memory medium 2. When each light falls on an end surface of one core 21 (which will be simply referred to as a core 21 hereinafter), a part of this light enters the core 21. The incident light is shut in the core 21 by the respective clads 22 which are in contact with the both upper and lower sides of the core 21, and travels while spreading. It is to be noted that the light in the core 21 is called a guided wave or the like.

Although optical axes of the positioning lights 101 and 103 and the read light 103 cross each other in FIG. 2, these optical axes do not have to cross each other. It is possible to adopt a configuration in which the optical axes of the respective lights are parallel with each other.

Figure 3:
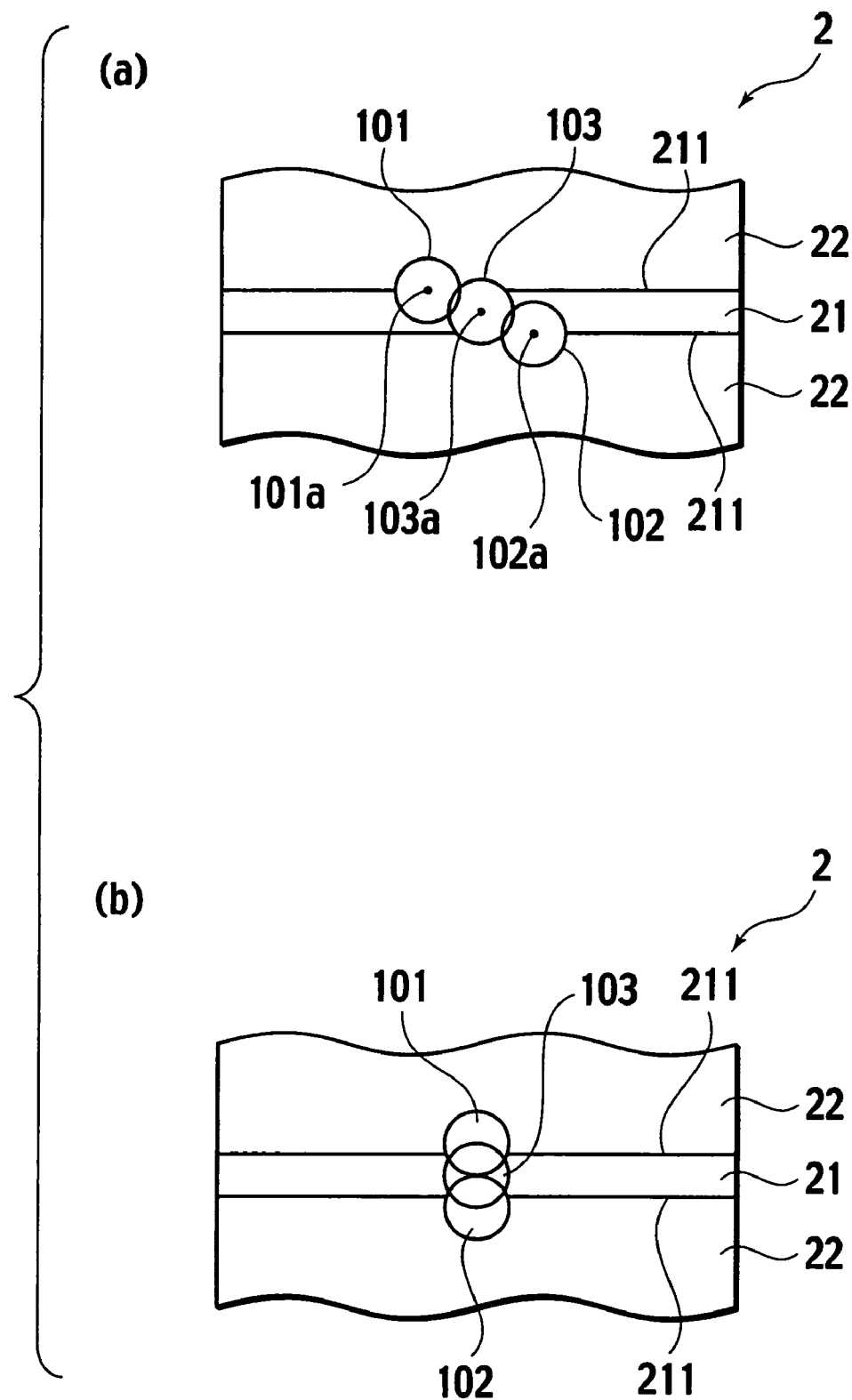
FIG. 3 is views showing an end surface of an optical memory medium from a condenser lens.

FIG. 3 is views showing the end surface 200 of the optical memory medium 2 from the condenser lens 12.

The optical axes 101a to 103a of the positioning lights 101 and 103 and the read light 103 shown in FIG. 3(a) are parallel with each interface 211 between the core 21 and the clad 22.

Further, the optical axis 101a of the positioning light 101 is offset (displaced) with respect to the optical axis 103a of the read light 103 in a thickness direction of the core 21. Furthermore, it is also offset in a direction parallel to the interface 211 (which is, e.g., a right-and-left direction in FIG. 3 and will be simply referred to as an "interface direction" hereinafter).

Moreover, the optical axis 102a of the positioning light 102 is offset with respect to the optical axis 103a of the read light 103 in the thickness direction of the core 21 and also in a direction opposite to the offset direction of the optical axis 101a by the same amount. Additionally, it is also offset in the interface direction and in a direction opposite to the offset direction of the optical axis 101a.

It is to be noted that the offset in the interface direction may not be provided as shown in FIG. 3(b).

Figure 4:
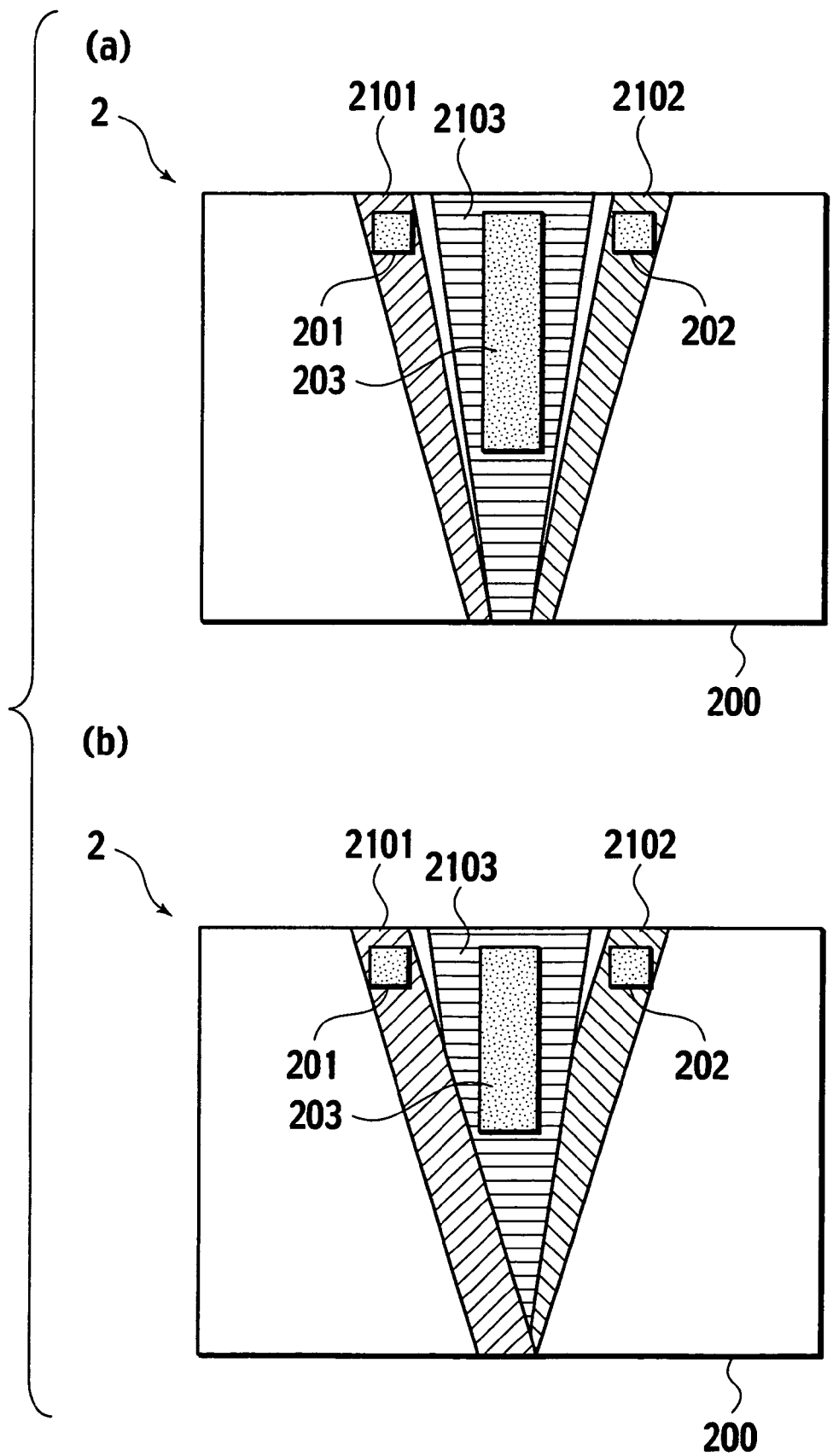
FIG. 4 is views showing each optical coupling area, each positioning mark and a data image from a clad side.

FIG. 4 is views showing respective optical coupling areas in which the positioning lights 101 and 102, the read light 103 and the core 21 are coupled, and positioning marks and data images written in the respective areas from the upper clad 22 side.

FIG. 4(a) shows an example of the optical memory reproduction apparatus 1 depicted in FIG. 2, and FIG. 4(b) shows an example where there is no offset in the interface direction for reference.

It is to be noted that, in a conformation in which the positioning lights 101 and 102 and the read light are independent from each other like the present embodiment, the positioning lights 101 and 102 do not necessarily have to be lights which spread in the core as shown in FIG. 4(b).

In the core 21, there are an optical coupling area 2101 in which the positioning light 101 alone is coupled, an optical coupling area 2102 in which the positioning light 102 alone is coupled and an optical coupling area 2103 in which the read light 103 alone is coupled. Such areas can be provided by the configuration of the condenser lens 12.

It is to be noted that an optical coupling area in which two or all lights are coupled may be provided in addition to these optical coupling areas. For example, an optical coupling area in which the positioning light 101 and the read light 103 are both coupled may exist between the optical coupling area 2101 and the optical coupling area 2103.

A positioning mark 201 which is a scattering factor required for positioning of the read light 103 is provided at the interface between the core and the clad or in the core in the optical coupling area 2101 and, when the positioning light 101 is coupled in the optical coupling area 2101, the positioning mark 201 causes scattering and interference of the positioning light 101, and the positioning light 101 exits as a positioning mark light 1011 to the outside the optical memory medium 2 from the interface between the core and the clad or the inside of the core where the scattering factor is formed through the clad 22.

The same positioning mark 202 as the positioning mark 201 is provided at the interface between the core and the clad or in the core of the optical coupling area 2102 and, when the positioning light 102 is coupled in the optical coupling area 2102, the positioning light 102 scatters and interferes by the positioning mark 202, and exits as a positioning mark light 1021 to the outside of the optical memory medium 2 from the interface between the core and the clad or the inside of the core where the scattering factor is formed through the clad 22.

Data is two-dimensionally recorded on the interface between the core and the clad or in the core of the optical coupling area 2103 by the scattering factor. This recorded data (the scattering factor) is referred to as a data image 203. When the read light 103 is coupled in the optical coupling area 2103, the read light 103 scatters and interferes by the data image 203, and exits to the outside of the optical memory medium 2 from the core 21 through the clad 22 as a data reproduction light 1031.

It is to be noted that a shape or a size of the positioning marks 201 and 202 and the data image is arbitrary.

Further, as shown in FIG. 2, the optical memory reproduction apparatus 1 comprises an imaging element 131 which images the positioning mark light 1011 and formed of a CCD (Charge Coupled Device) or a CMOS (Complementary Metal Oxide Semiconductor) (which is the same in other imaging elements), an imaging element 132 which images the positioning mark light 1021, and an imaging element 133 which images the data reproduction light 1031. Furthermore, the optical memory reproduction apparatus 1 comprises a data reproducing unit 14 which reproduces data based on a data reproduction signal 133a including a reproduced image obtained by the imaging element 133.

Moreover, the optical memory reproduction apparatus 1 comprises a light source lens moving mechanism 15 which moves the light source 11 and the condensing lens 12 in a thickness direction of the core 21 without changing a relative position of these members. The light source lens moving mechanism 15 enables scanning in the thickness direction of the core 21 while applying the positioning lights 101 and 102 and the read light 103 to the end surface 200 of the optical memory medium 2 while maintaining a relative position of the respective lights constant.

Additionally, the optical memory reproduction apparatus 1 comprises a light source lens moving mechanism control unit 16 which monitors a change in a light intensity of the positioning mark light 1011 detected by the imaging element 131 and a light intensity of the positioning mark light 1021 detected by the imaging element 132 and controls the light source lens moving mechanism 15 by an electrical signal.

An operation of the optical memory reproduction apparatus 1 will now be described.

Here, it is assumed that scanning is performed in the thickness direction of the core 21 while applying the positioning light 101 and 102 and the read light 103 to the end surface 200 of the optical memory medium 2 by moving the light source 11 and the condenser lens 12 in the thickness direction of the core 21 indicated by an arrow A1 in FIG. 2 by the light source lens moving mechanism 15.

Figure 5:
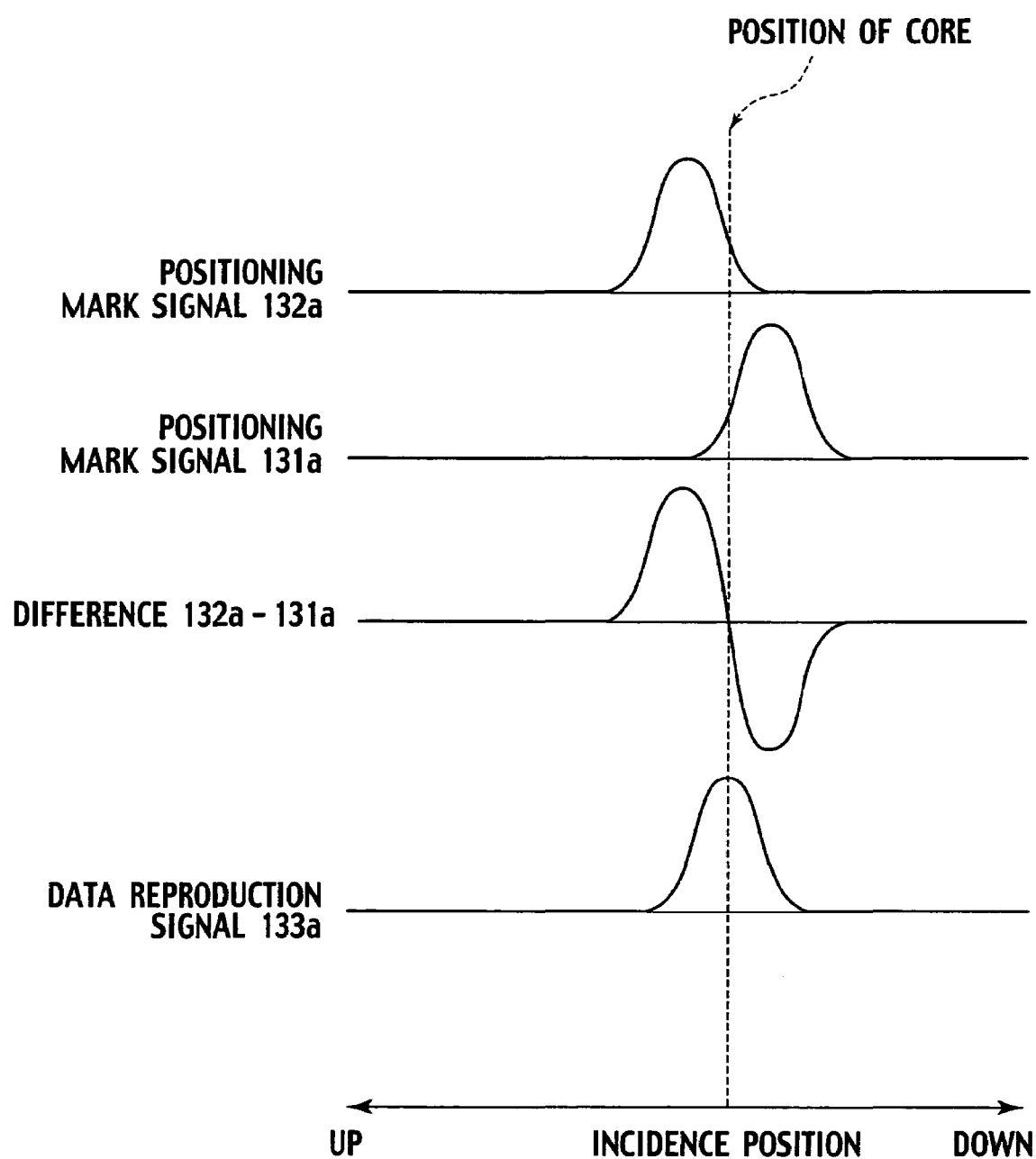
FIG. 5 is a view showing levels of positioning mark signals, a level of a difference signal and a level of a data reproduction signal at the time of scanning.

FIG. 5 is a view showing levels of positioning mark signals 131a and 1332a respectively generated by the imaging elements 131 and 132, a level of a difference signal obtained by subtracting the former from the latter, and a level of a data reproduction signal 133a generated by the imaging element 133.

The imaging elements 131 and 132 output the positioning mark signals 131a and 132a having levels corresponding to a light intensity (brightness) of a reproduced image obtained by each of these elements. When the light source lens moving mechanism control unit 16 moves the light source 11 and the condenser lens 12 and each positioning light is scanned from, e.g., an upper side toward a lower side in FIG. 2 along the thickness direction of the score 21, the positioning mark signal 132a is first output, then takes the maximum value at a given position and is thereafter reduced. When scanning is further performed, the positioning mark signal 131a is output this time, then takes the maximum value at a given position, and is thereafter reduced.

Further, although the imaging element 133 outputs the data reproduction signal 133a having a level corresponding to a light intensity of a reproduced image obtained by this element, the level of the data reproduction signal 133a becomes maximum by positioning an optical axis 103a of the read light 103 at the center in the thickness direction of the core 21. In order to realize this, it is good enough to execute the position control at a position where reproduced images having the same brightness can be obtained by the both imaging elements 131 and 132, and hence performing the feedback control in such a manner that the positioning mark signal 131a and the positioning mark signal 132a have the same level can suffice. In reality, the optical memory reproduction apparatus 1 performs the control in such a manner that the difference signal of these signals indicate 0.

Figure 6:
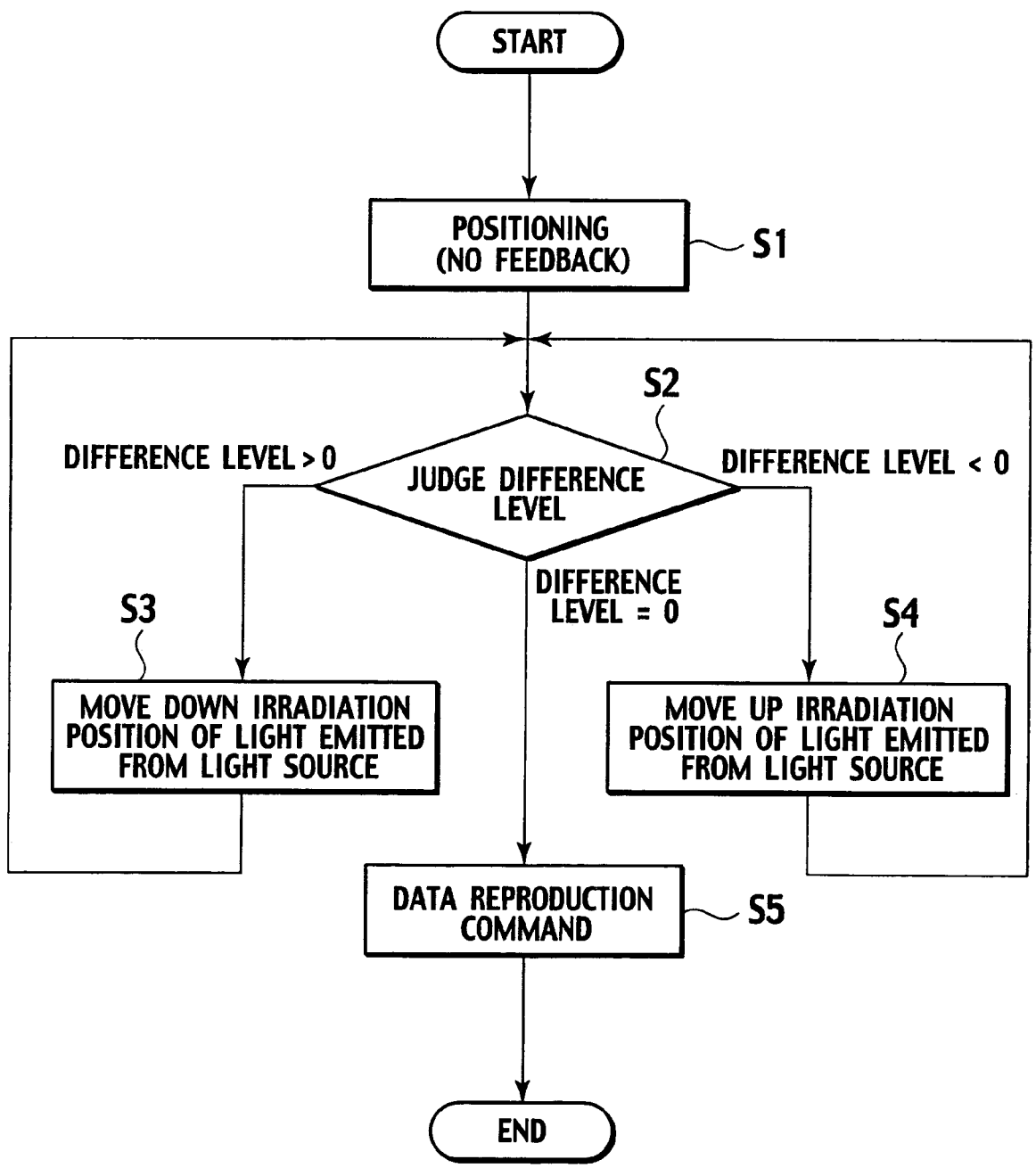
FIG. 6 is a view showing a processing procedure of a light source lens moving mechanism control section when the optical memory reproduction apparatus performs positioning.

FIG. 6 is a view showing a processing procedure of the light source lens moving mechanism control unit 156 when the optical memory reproduction apparatus 1 effects positioning. The light source lens moving mechanism control unit 16 comprises a central processing unit which performs processing based on a computer program.

The optical memory reproduction apparatus 1 monitors a change in light intensity of each positioning mark light and determines an incidence position. Upon receiving a positioning command when, e.g., a power supply is turned on, the optical memory reproduction apparatus 1 first positions the light source 11 and the condenser lens 12 (step S1).

At this time, the feedback control using the positioning mark signals 131a and 132a is not performed, and the light source 11 and the condenser lens 12 are moved from standby positions by a preset distance. That is because lamination intervals of the optical memory medium 2 are substantially fixed and known, how much these members should be moved from positions when the core 21 is in the standby mode can be previously calculated.

Subsequently, the light source lens moving mechanism control unit 16 obtains a difference level obtained by subtracting a level of the positioning mark signal 131a from a level of the positioning mark signal 132a (step S2). Here, if the difference level>0 is achieved, as shown in FIG. 5, incidence positions of the positioning lights 101 and 102 and the read light 103 are too high, and hence an irradiation position of a light emitted from the light source 1 is moved down (step S3).

On the other hand, if the difference level<0 is achieved, as shown in FIG. 5, incidence positions of the positioning lights 101 and 102 and the read light 103 are too low, and hence an irradiation position of the light emitted from the light source 11 is moved up (step S4). In this manner, since the optical axis 103a of the read light 103 is positioned at the center of the core 21 if the difference level=0 is achieved, a command for reproduction of data is issued to the data reproduction unit 14 (step S5). The data reproduction unit 14 which has accepted the command reproduces data by using the data reproduction signal 133a.

It is to be noted that the difference level=0 is likewise achieved when the three lights all do not enter the core 21, but a reproduced image by the imaging element 133 cannot be obtained in such a case, and hence it can be understood that incidence positions are inappropriate. If it is revealed that these positions are inappropriate, the positions can be readjusted in such a manner that a reproduced image by the imaging element 133 can be obtained.

Figure 7:
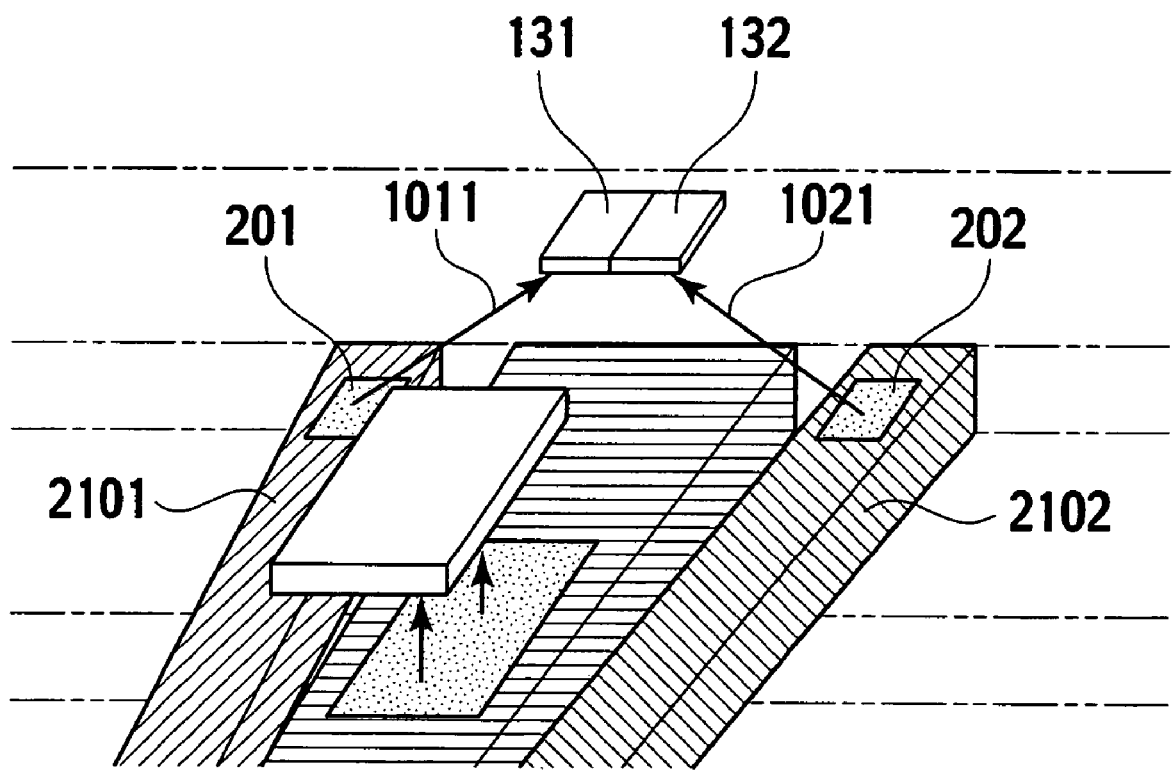
FIG. 7 is a view showing exiting directions of a positioning mark light or a data reproduction light when an imaging element is provided at the same position.

Furthermore, at least two of the imaging elements 131 to 133 may be provided at the same position. As shown in FIG. 7, if these members are provided at the same position, the imaging elements provided at the same position can be reduced in size by inclining exiting directions of the positioning mark lights 1011 and 1021 or the data reproduction light 1031 from directions vertical to the interface 211.

Moreover, a condensing pattern of each of the positioning lights 101 and 102 and the read light 103 is not restricted to a dot-like shape or a circular shape, and it may be a zonal shape, an elliptic shape or a rectangular shape. Incidentally, in case of a zonal shape or an elliptic shape, it is preferable that the longitudinal direction matches with the interface direction or the thickness direction of the core.

Additionally, the positioning lights 101 and 102 may be alternately generated in a time-sharing manner. In this case, although the positioning mark signals 131a and 132a cannot be simultaneously obtained, a difference level can be detected by storing levels of these signals in a memory, and the difference level can be controlled to be zero.

Figure 8:
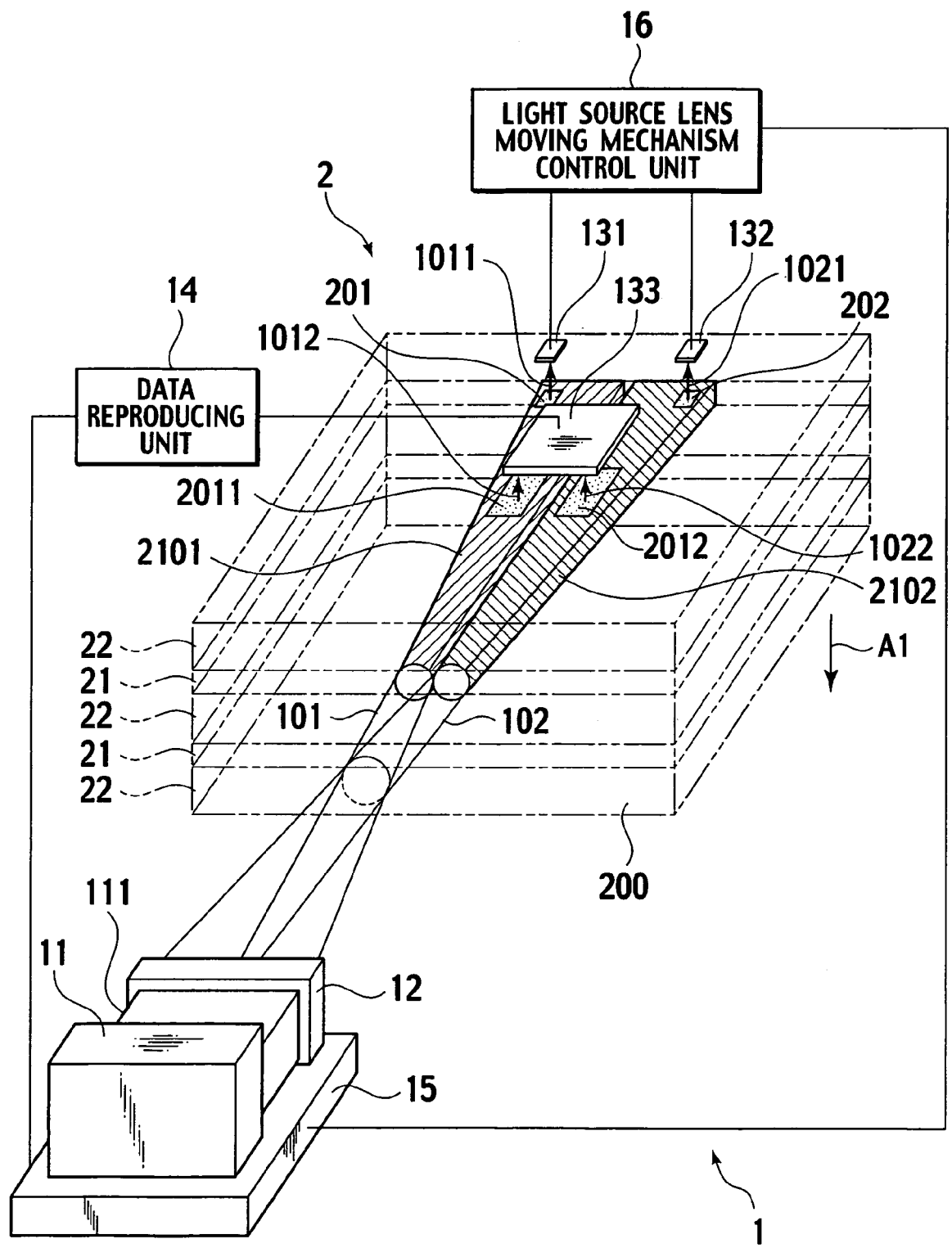
FIG. 8 is a view showing a configuration and a utilization mode of the apparatus when a positioning light is used as a read light.
Figure 9:
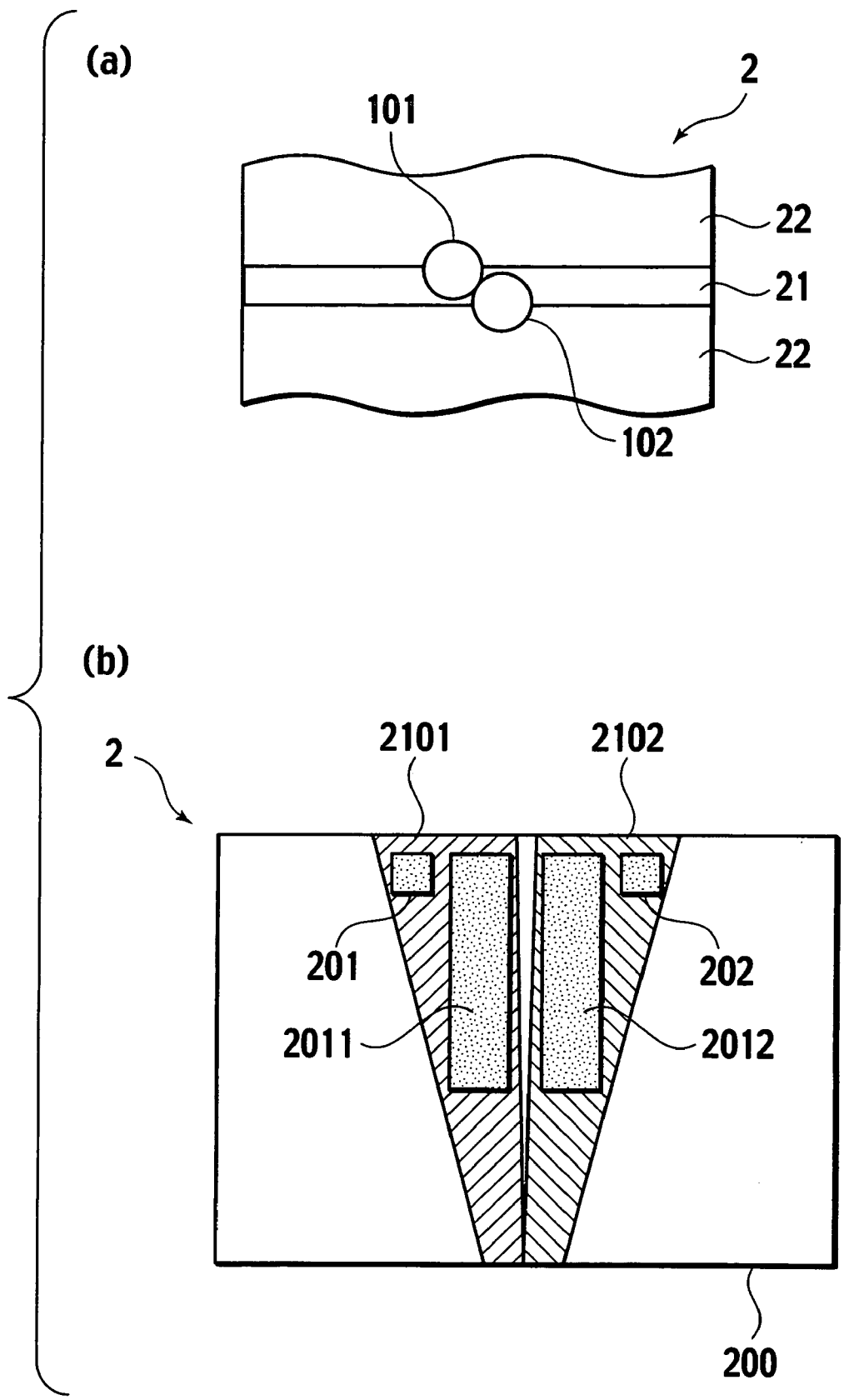
FIG. 9 is a view showing an end surface of the optical memory medium from the condenser lens when the positioning light is used as the read light, and a view showing each optical coupling area, each positioning mark and each data image from the clad side in such a case.

Further, as shown in FIGS. 8 and 9, one positioning light 101 can be used as the read light 103 for data reproduction, and the other positioning light 102 can be likewise used as the read light 103 for data reproduction. By this configuration, the condenser lens 12 can be simplified. It is to be noted that FIG. 8 is a view for comparison with FIG. 2, FIG. 9(a) is a view for comparison with FIG. 3, and FIG. 9(b) is a view for comparison with FIG. 4.

That is, a part of data is two-dimensionally recorded as a data image 2011 at the interface between the core and the clad or in the core of the optical coupling area 2101, and the remaining data is recorded as a data image 2012 at the interface between the core and the clad or in the core of the optical coupling area 2102.

When the positioning lights 101 and 102 are respectively coupled in the optical coupling areas 2101 and 2102, the positioning lights scatter and interfere by the data images 2011 and 2012, and exit as data reproduction lights 1012 and 1022 to the outside of the optical memory medium 2 from the interface between the core and the clad or the inside of the core where the scattering factor is formed through the clad 22. Then, the imaging element 133 images the data reproduction lights 1012 and 1022, and the data reproducing unit 14 reproduces data from the respective obtained reproduced images.

Figure 10:
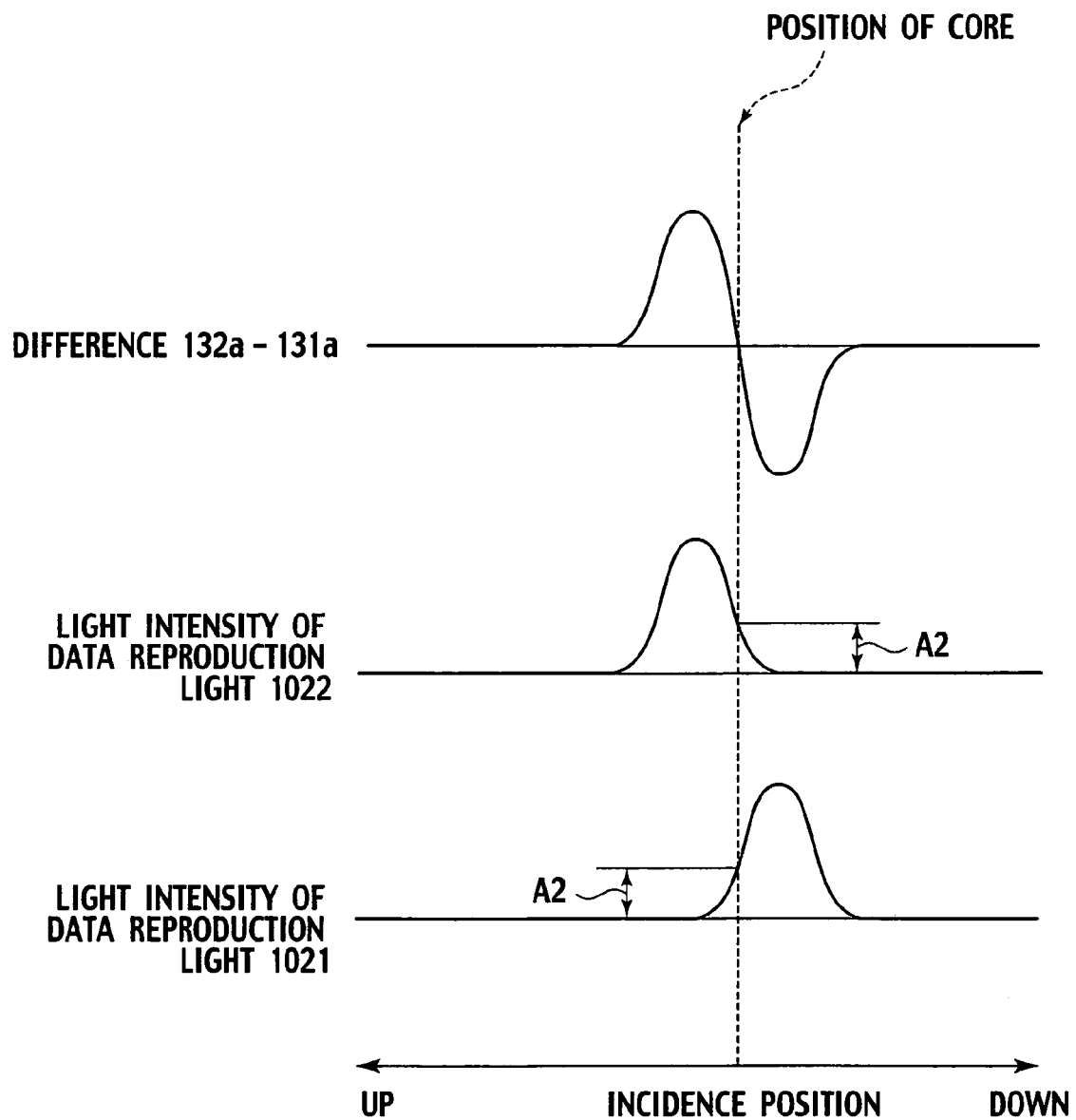
FIG. 10 is a view showing a level of a difference signal and a light intensity of each data reproduction signal when the positioning light is used as the read light.

It is to be noted that, when scanning is performed by applying the positioning lights 101 and 102 to the end surface 200 of the optical memory medium 2, light intensities of the data reproduction lights 1012 and 1022 show the same tendency as that of the positioning mark signals 131a and 132a, and hence light intensities (indicated by an arrow A2) of the data reproduction lights 1012 and 1022 when a difference between the positioning mark signals 131a and 132a becomes zero as shown in FIG. 10 have a value smaller than the maximum value, but it is good enough for this value to be used for data reproduction of the data images 2011 and 2012.

Further, although the description has been given as to the example where the positioning lights 101 and 102 respectively have an offset in the interface direction in FIGS. 8 to 10, the offset in the interface direction does not have to exist as shown in FIG. 3(b) or FIG. 4(b).

Meanwhile, when the two positioning lights 101 and 102 are used to perform positioning and the read light is solely provided for data reproduction, the three lights in total are used in the foregoing embodiment, but the functions of the respective lights can be achieved by the single read light as follows.

Figure 11:
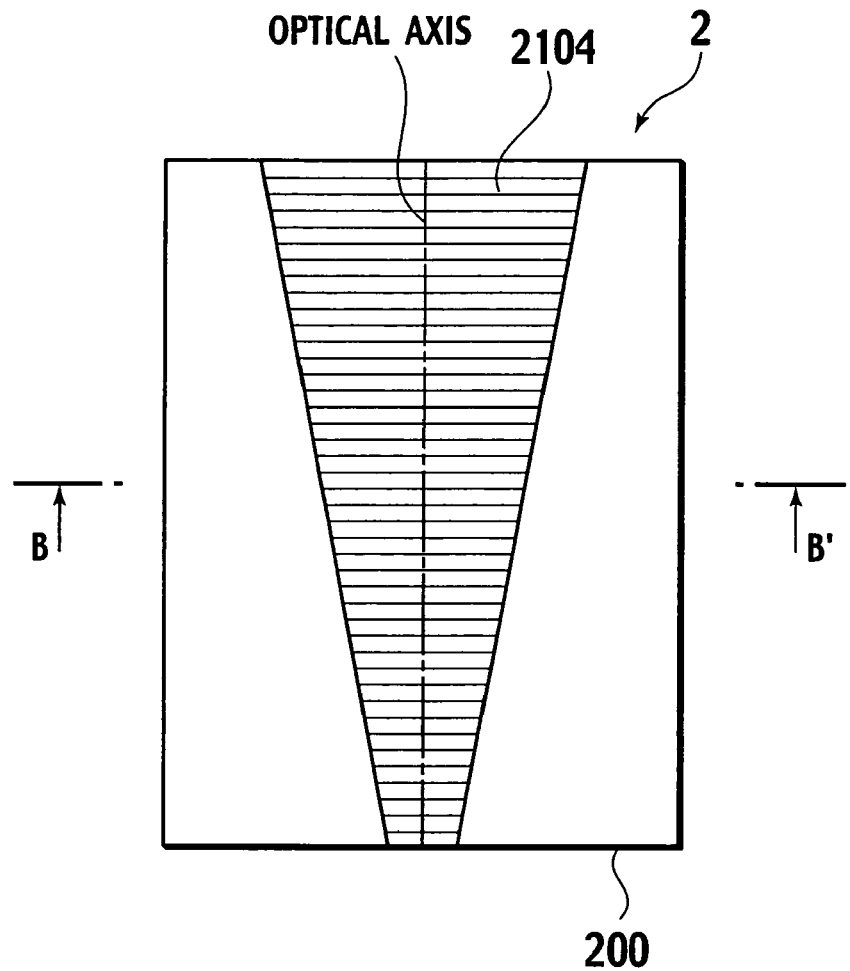
FIG. 11 is a view showing the optical coupling area from the clad side when a single read light is used.

The condenser lens 12 first generates as a single read light a read light 104 whose condensing pattern has a zonal shape or an elliptic shape and which has an optical axis parallel to an interface 211 of the core 21. The read light 104 has a focal point on the end surface 200 of the optical memory medium 2 and, when a part of the read light 104 enters the core 21, this light travels in the core while spreading in the interface direction as shown in FIG. 11. Therefore, an optical coupling area 2104 in which the read light 104 and the core 21 are coupled is formed.

Figure 12:
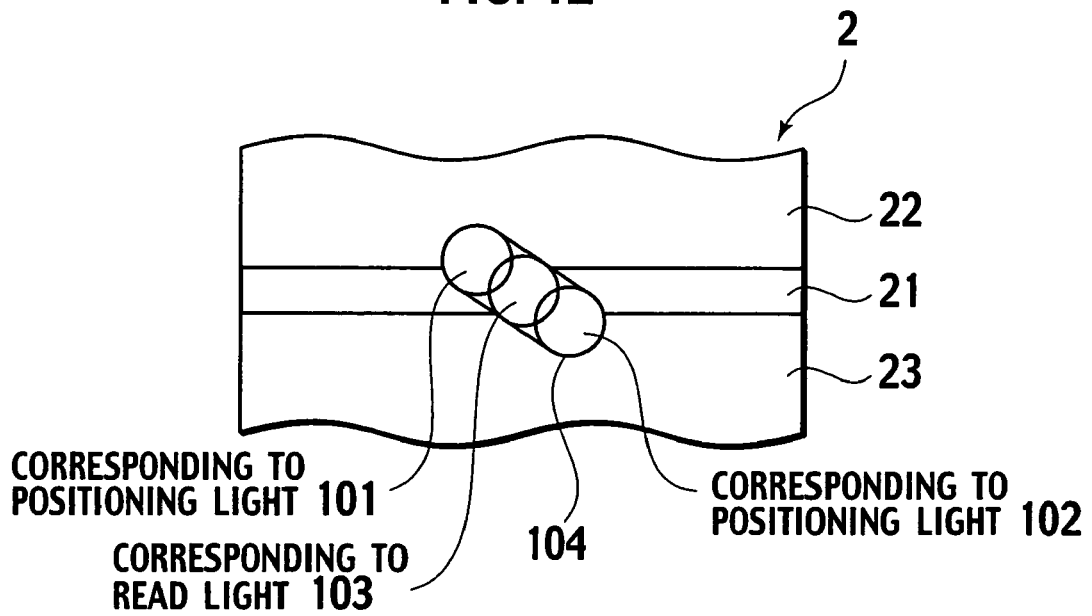
FIG. 12 is a view showing the end surface of the optical memory medium from the condenser lens when the single read light is used.

Furthermore, as shown in FIG. 12, by inclining the read light 104 around the optical axis thereof, one end portion of the read light 104 is offset in the thickness direction of the core 21. Moreover, by inclining the read light around the optical axis in this manner, the other end portion of the read light 104 is offset in the thickness direction of the core 21 and in the direction opposite to the offset direction of one end portion by the same quantity. Therefore, one end portion of the read light 104 corresponds to, e.g., the positioning light 101, the other end portion of the same corresponds to the positioning light 102, and a central portion of the read light 104 including the optical axis corresponds to the read light 103.

Therefore, in place of the three lights used in the optical memory reproduction apparatus 1, this read light 104 is applied, one end portion of the read light 104 is handled as, e.g., the positioning light 101, the other end portion of the read light 104 is handled as the positioning light 102, and the central portion of the read light 104 is handled as the read light 103, thereby obtaining the same effects and advantages as those obtained when the three lights are used.

Figure 13:
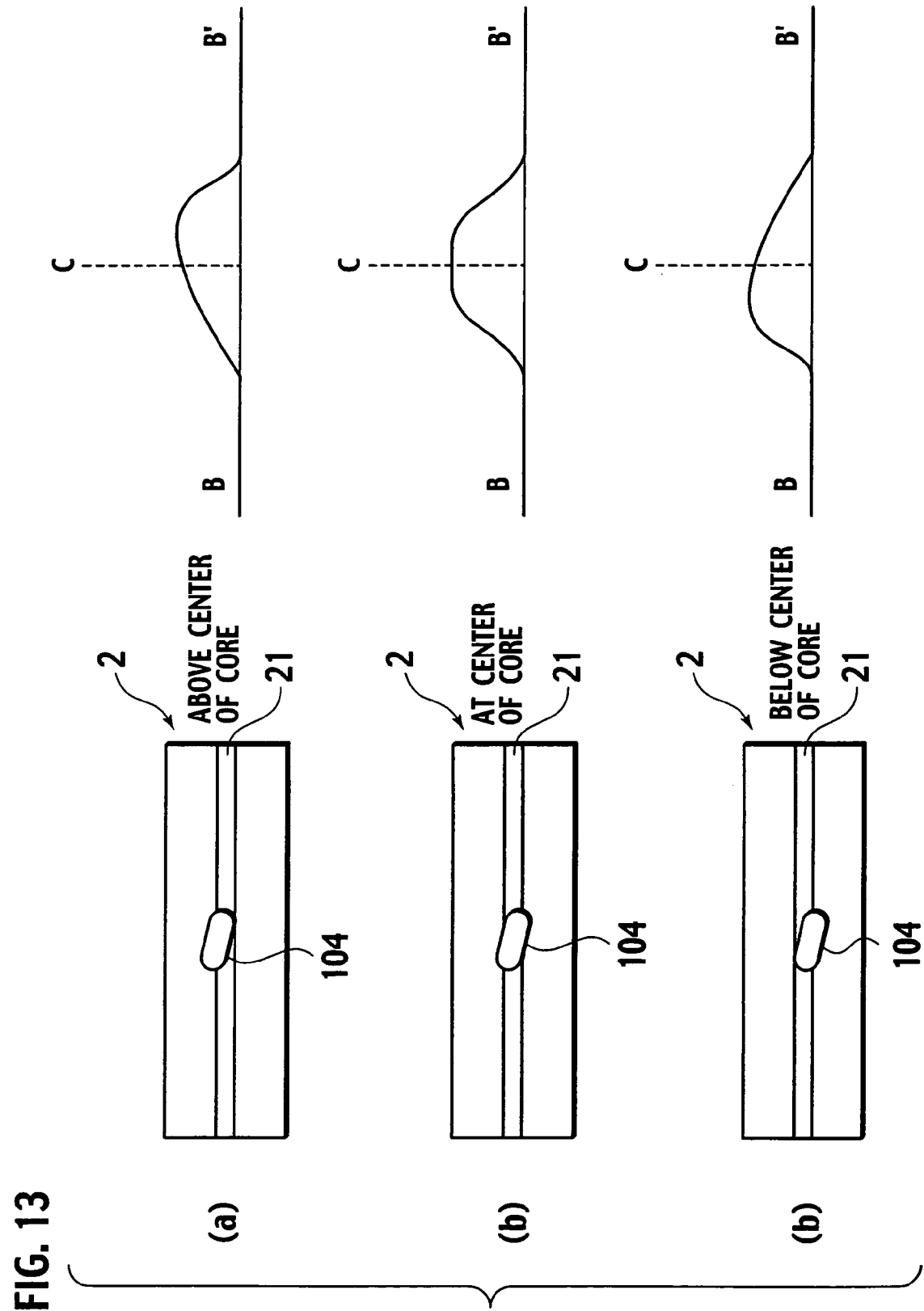
FIG. 13 is views showing incidence positions and light intensity distributions in the core when the single read light is used.

It is to be noted that FIG. 13 is views showing light intensity distributions of the read light 104 in a cross section taken along a line BB' of FIG. 11, and reference character C notes a position corresponding to the optical axis of the read light 104.

As shown in FIG. 13(a), in cases where the read light 104 is scanned, when the optical axis is placed at (above) the position deviating from the center in the thickness direction of the core 21, for example, a right end portion of the read light 104 is aboundingly coupled with the core 21, and hence a distribution of a light intensity is high on, e.g., the right side of the optical axis. Moreover, when the optical axis of the read light 104 is placed at the center in the thickness direction of the core 21 as shown in FIG. 13(b), the distribution of the light intensity becomes symmetrical with the optical axis at the center. Additionally, when the optical axis is placed at (below) a position deviating from the center in the thickness direction of the core 21, for example, a left end portion of the read light 104 is aboundingly coupled with the core 21, and hence the distribution of the light intensity is high on, e.g., the left side of the optical axis.

Although the light intensity shows the continuous distribution in this manner, it is apparent that the positioning mark signal 131a reproduced by the positioning mark 201 provided in the area (corresponding to the optical coupling area 2101) where one (left) end portion of the read light 104 is coupled with the core 2 changes as shown in FIG. 5. Further, it is obvious that the positioning mark signal 132a reproduced by the positioning mark 202 provided in the area (corresponding to the optical coupling area 2102) where one (right) end portion of the read light 104 is coupled with the core 21 also changes as shown in FIG. 5. Furthermore, it is clear that the data reproduction signal 133a reproduced by the data image 203 provided in the area (corresponding to the optical coupling area 2103) where the central portion of the read light 104 is coupled with the core 21 also changes as shown in FIG. 5.

Therefore, even if the read light 104 is used, the optical axis of the read light 104 can be positioned at the center in the thickness direction of the core 21 by the processing shown in FIG. 6.

As described above, according to the optical memory reproduction apparatus and the incidence positioning method for the read light of this embodiment, when the read light which is used to reproduce data from the optical memory medium travels while spreading in the core of the optical memory medium, the read light is caused to accurately enter the core, thereby reproducing the data without any error. Therefore, wobbling or the like is no longer necessary, and the optical memory reproduction apparatus using the read light which spreads in the interface direction can be realized.

It is to be noted that the description has been given as to the technique concerning one core 21 in the foregoing embodiment, but it is needless to say that this technique can be applied to all the cores 21 constituting the optical memory medium 2.

Moreover, the example in which the positioning mark lights 1011 and 1021 are imaged by the imaging elements 131 and 132 has been described in the foregoing embodiment. However, any light receiving element can be used as long as this element can detect intensities of the positioning mark lights 1011 and 1021 and, for example, a photodiode (PD) or the like can be used in place of each of the imaging elements 131 and 132.

Additionally, in the foregoing embodiment, there is used the mechanism 15 which moves the light source 11 and the condenser lens 12 in the thickness direction of the core 21 without changing a relative position of these members. However, the relative position of the light source 11 and the condenser lens 12 does not have to be fixed if an incidence position of a light emitted from the light source 11 with respect to the core 21 in the thickness direction thereof can be changed, and a mechanism which moves one of the light source 11 and the condenser lens 12 can be also used.

INDUSTRIAL APPLICABILITY

According to the optical memory reproduction apparatus and the read light positioning method of the present invention, when the read light which is used to reproduce data from the optical memory medium travels while spreading in the core of the optical memory medium, the read light can be caused to accurately enter the core.

The invention claimed is:

1. An optical memory reproduction apparatus which reproduces data from an optical memory medium comprising: cores each of which constitutes a planar optical waveguide, and clads which sandwich each core, and having: a data image in which data is recorded as a scattering factor; and a pair of positioning marks which are respectively scattering factors required for positioning, at an interface between a core and a clad or in the core, the optical memory reproduction apparatus comprising:
a light source which emits: a read light which is caused to enter the core from an end surface of the optical memory medium, travels while spreading in the core, and is coupled with the core to form an optical coupling area in such a manner that the optical coupling area includes the data image; and a pair of positioning lights which are caused to enter the core with offsets with respect to the read light in opposite directions along a thickness direction of the core, travels in the core, and are coupled with the core to form optical coupling areas in such a manner that the optical coupling areas include the pair of positioning marks;
a data reproduction light imaging element which receives a data reproduction light generated due to scattering and interference of the read light in the data image;
a data reproducing unit which reproduces data imaged by the data reproduction light imaging element;
a positioning mark light receiving element which receives a pair of positioning mark lights generated due to scattering and interference of the pair of positioning lights in the pair of positioning marks; and
a light source position control unit which controls an incidence position of the read light with respect to the core in the thickness direction thereof based on intensities of the pair of positioning mark lights detected by the positioning mark light receiving element.

2. The optical memory reproduction apparatus according to claim 1, wherein a condensing pattern of each positioning light is a dot-like shape or a circular shape.

3. The optical memory reproduction apparatus according to claim 1, wherein the light source alternately emits the pair of positioning lights in a time-sharing manner.

4. An optical memory reproduction apparatus which reproduces data from an optical memory medium comprising: cores each of which constitutes a planar optical waveguide; and clads which sandwich each core, and having: a pair of data images in which the data is recorded as a scattering factor; and a pair of positioning marks which are respectively scattering factors required for positioning, at an interface between a core and a clad or in the core, the optical memory reproduction apparatus comprising:
a light source which emits a pair of positioning/read lights which are caused to enter the core from an end surface of the optical memory medium at different positions in a thickness direction of the core, travel while spreading in the core, and are coupled with the core to form optical coupling areas in such a manner that the optical coupling areas respectively include the pair of data images and the pair of positioning marks;
a data reproduction light imaging element which receives a pair of data reproduction lights generated due to scattering and interference of the pair of positioning/read lights in the pair of data images;
a data reproducing unit which reproduces data imaged by the data reproduction light imaging element;
a positioning mark light receiving element which receives a pair of positioning mark lights generated due to scattering and interference of the pair of positioning/read lights in the pair of positioning marks; and
a light source position control unit which controls incidence positions of the pair of positioning/read lights with respect to the core in the thickness direction thereof based on intensities of the pair of positioning mark lights detected by the positioning mark light receiving element.

5. The optical memory reproduction apparatus according to claim 4, wherein a condensing pattern of each positioning/read light is a dot-like shape or a circular shape.

6. The optical memory reproduction apparatus according to claim 4, wherein the light source alternately emits the pair of positioning/read lights in a time-sharing manner.

7. An optical memory reproduction apparatus which reproduces data from an optical memory medium comprising: cores each of which constitutes a planar optical waveguide; and clads which sandwich each core, and having: a data image in which data is recorded as a scattering factor; and a pair of positioning marks which are respectively scattering factors required for positioning, at an interface between a core and a clad or in the core, the optical memory reproduction apparatus comprising:
a light source which emits a positioning/read light which has a elliptic or rectangular cross section, is caused to enter the core from an end surface of the optical memory medium at an angle by which a longitudinal direction of the cross section is not parallel with the interface, travels while spreading in the core, and is coupled with the core to form an optical coupling area in such a manner that a central portion of the optical coupling area includes the data image and both end portions of the optical coupling area includes the pair of positioning marks;
a data reproduction light imaging element which receives a data reproduction light generated due to scattering and interference of the positioning/read light in the data image;
a data reproducing unit which reproduces data imaged by the data reproduction light imaging element;
a positioning mark light receiving element which receives a pair of positioning mark lights generated due to scattering and interference of the positioning/read light in the pair of positioning marks; and
a light source position control unit which controls an incidence position of the positioning/read light with respect to the core in a thickness direction thereof based on intensities of the pair of positioning mark lights detected by the positioning mark light receiving element.

8. The optical memory reproduction apparatus according to claim 1, claim 4 or claim 7, wherein the light source position control unit compares the intensities of the pair of positioning mark lights with each other, determines a movement direction of the light emitted from the light source and moves the light in accordance with a result of the comparison, and controls the incidence position of the light emitted from the light source in such a manner that an intensity difference becomes zero.

9. An incidence positioning method for a read light in an optical memory reproduction apparatus applying the read light which travels while spreading to a core portion on an end surface of an optical memory medium comprising cores each of which constitutes a planar optical waveguide and clads which sandwich each core and having a data image in which data is recorded as a scattering factor and a pair of positioning marks which are respectively scattering factors required for positioning, at an interface between a core and a clad or in the core, the read light being coupled with the core to form an optical coupling area in such a manner that the optical coupling area includes the data image, the optical memory reproduction apparatus reproducing data based on a data reproduction light generated due to scattering and interference of the read light in the data image, the incidence positioning method comprising:

causing a pair of positioning lights to enter the end surface of the optical memory medium in such a manner that the pair of positioning lights have offsets with respect to the read light in opposite directions along a thickness direction of the core;

forming an optical coupling area by coupling of the pair of positioning lights which have entered the core with the core in such a manner that the optical coupling area includes the pair of positioning marks;

receiving by a positioning mark light receiving element a pair of positioning mark lights generated due to scattering and interference of the pair of positioning lights in the pair of positioning marks; and controlling an incidence position of the read light emitted from the light source with respect to the core in a thickness direction thereof based on intensities of the pair of positioning mark lights which have entered the positioning mark light receiving element.

10. The incidence positioning method according to claim 9, wherein a condensing pattern of each positioning light is a dot-like shape or a circular shape.

11. The incidence positioning method according to claim 9, wherein the pair of positioning lights are alternately emitted in a time-sharing manner.

12. An incidence positioning method for a pair of positioning/read lights in an optical memory reproduction apparatus applying the pair of positioning/read lights which travel while spreading to a core portion on an end surface of an optical memory medium comprising cores each of which constitutes a planar optical waveguide and clads which sandwich each core and having a pair of data images in which data is recorded as a scattering factor and a pair of positioning marks which are respectively scattering factors required for positioning, at an interface between a core and a clad or in the core, the pair of positioning/read lights being coupled with the core to form optical coupling areas in such a manner that the optical coupling areas include the pair of data images, the optical memory reproduction apparatus reproducing data based on a pair of data reproduction lights generated due to scattering and interference of the pair of positioning/read lights in the pair of data images, the incidence positioning method comprising:

forming optical coupling areas by coupling the pair of positioning/read lights which have entered the core with the core in such a manner that the optical coupling areas include the pair of positioning marks;

receiving by positioning mark light receiving element a pair of positioning mark lights generated by scattering and interference of the pair of positioning/read lights in the pair of positioning marks; and controlling incidence positions of the pair of positioning/read lights emitted from the light source with respect to the core in a thickness direction thereof based on intensities of the pair of positioning mark lights which have entered the positioning mark light receiving element.

13. The incidence positioning method according to claim 12, wherein a condensing pattern of each positioning/read light is a dot-like shape or a circular shape.

14. The incidence positioning method according to claim 12, wherein the pair of positioning/read lights are alternately emitted in a time-sharing manner.

15. An incidence positioning method for a positioning/read light in an optical memory reproduction apparatus applying the positioning/read light which has an elliptic or rectangular cross section and travels while spreading to a core portion on an end surface of an optical memory medium at an angle by which a longitudinal direction of the cross section is not parallel with an interface between a core and a clad, the optical memory medium comprising cores each of which constitutes a planar optical waveguide and clads which sandwich each core and having a data image in which data is recorded as a scattering factor and a pair of positioning marks which are respectively scattering factors required for positioning at the interface between the core and the clad or in the core, the positioning/read light being coupled with the core to form an optical coupling area in such a manner that the optical coupling area includes the data image, the optical memory reproduction apparatus reproducing data based on a data reproduction light generated due to scattering and interference of the positioning/read light in the data image, the incidence positioning method comprising:

forming the optical coupling area by coupling the positioning/read light which has entered the core with the core in such a manner that both end portions of the optical coupling area include the pair of positioning marks;

receiving by a positioning mark light receiving element a pair of positioning mark lights generated due to scattering and interference of the positioning/read light in the pair of positioning marks; and controlling an incidence position of the positioning/read light emitted from the light source with respect to the core in a thickness direction thereof based on intensities of the pair of positioning mark lights which have entered the positioning mark light receiving element.

16. The incidence positioning method according to claim 9, claim 12 or claim 15, wherein the step of controlling a position of the light source compares the intensities of the pair of positioning mark lights with each other, determines a movement direction of the light emitted from the light source and moves the light in accordance with a result of the comparison, and controls the incidence position of the light emitted from the light source in such a manner that an intensity difference becomes zero.

* * * * *